United States Patent [19]

McConnell

[11] Patent Number: 4,512,907

[45] Date of Patent: Apr. 23, 1985

[54] ICE MELTER AND METHOD OF MAKING SAME

[75] Inventor: Forrest M. McConnell, Lake Forest, Ill.

[73] Assignee: Koos, Inc., Kenosha, Wis.

[21] Appl. No.: 577,257

[22] Filed: Feb. 6, 1984

[51] Int. Cl.$^3$ .............................................. C09K 3/18
[52] U.S. Cl. ...................................... 252/70; 106/13
[58] Field of Search ............................. 252/70; 106/13

[56] References Cited

U.S. PATENT DOCUMENTS

| 2,979,463 | 4/1961 | Ferguson ............................ 252/70 |
| 3,833,504 | 9/1974 | Neitzel et al. ........................ 252/70 |
| 4,431,558 | 2/1984 | Wada et al. .......................... 252/70 |

FOREIGN PATENT DOCUMENTS

| 1534176 | 7/1969 | Fed. Rep. of Germany ........ 252/70 |

OTHER PUBLICATIONS

Mohanty et al., "Viscosity of Potassium Chloride and Sodium Chloride in Aqueous Urea Solutions at 30° and 35°", J. Indian Chem. Soc., 1983, 60(11), 1059–61.

*Primary Examiner*—Paul Lieberman
*Attorney, Agent, or Firm*—McWilliams, Mann, Zummer & Sweeney

[57] ABSTRACT

This invention relates to a composition for melting ice, particularly for melting ice from driveways, sidewalks and the like.

The composition includes a salt, more particularly sodium and/or potassium chloride and an amide such as urea.

The method of making the composition includes the steps of (1) sizing the salt, (2) spraying a liquid amide thereon, and (3) drying the resultant composition.

3 Claims, No Drawings

ICE MELTER AND METHOD OF MAKING SAME

BACKGROUND OF THE INVENTION

1. Field of the Invention

This invention relates to compositions for melting ice and more particularly for melting ice on driveways, sidewalks, and the like.

The invention also contemplates the method of making the composition.

2. Description of the Prior Art

Unrefined rock salt has long been used to melt ice on driveways, sidewalks and the like; however, the wide variation in particle size makes it nearly impossible to spread uniformly. Moreover, the impurities in the salt leave an unsightly coating on the melted surface which, when tracked indoors, is damaging to floors and carpeting. Vegetation is also vulnerable to damage from salt. Sodium builds up in the soil and ultimately can result in the soil becoming completely toxic to plant growth.

Examples of patents which relate to compositions for melting ice are U.S. Pat. No. 2,626,219 which deals with a sawdust sprayed with a salt solution; U.S. Pat. No. 3,108,075 which deals with the use of urea; U.S. Pat. No. 3,227,654 which deals with a urea alkali-metal nitrate composition; U.S. Pat. No. 2,988,509 which deals with a mixture of sodium chloride and calcium chloride; U.S. Pat. No. 2,980,620 which does not use any chlorides at all; U.S. Pat. No. 4,283,297 which does not use any salts; U.S. Pat. No. 2,158,854 which deals with an aluminum chloride, sodium chloride and potassium chloride composition; U.S. Pat. No. 3,772,202 which does not use urea; U.S. Pat. No. 4,081,256 which does not use sodium chloride; U.S. Pat. No. 4,119,556 which is a thermal energy storage material that does not use urea; and U.S. Pat. No. 4,175,613 which is an energy storage material which is not pertinent at all.

None of these references shows the composition of this invention.

SUMMARY OF THE INVENTION

The salt, i.e., sodium chloride and/or potassium chloride, used in the composition of this invention is completely soluble and virtually free of calcium sulfate and other materials forming white deposits on melted surfaces. A predetermined size range of solid materials that are most effective in reducing hazardous conditions has been determined for sodium chloride and/or potassium chloride to be approximately 94% between 1.19-2.36 millimeters. Since potassium chloride is included as a substantial component, the danger of damage to vegetation is reduced to near zero.

The hygroscopicity of sodium chloride and potassium chloride is low; however, by coating the two materials with an amide such as urea, the melting action of the composition is greatly enhanced. Urea, being very hygroscopic, goes into solution at once when exposed to ice or snow, thus providing an aquatic solution to speed the dissolution of the sodium and potassium chloride.

DESCRIPTION OF PREFERRED EMBODIMENT

The present invention provides an ice melting composition designed primarily for use on driveways, sidewalks and the like, which is in a dry, stable form that lends itself readily to application. The invention relates to a chemical composition including a salt such as sodium chloride and/or potassium chloride and an amide such as urea, which is characterized by an enhanced ice melting capability.

From the foregoing, it can be seen that an ice melter composition has been provided which is simple to use and harmless to the user and wherein the composition includes a salt, preferably a mixture of sodium and/or potassium chloride together with an amide which is preferably urea. The urea is coated on the sodium chloride/potassium chloride combination from about 1% to about 4% by weight of the salt. The sodium chloride/potassium chloride combination is present by weight in about three parts of sodium chloride to one part of potassium chloride.

The peculiar combination of ingredients in the ice melter of this invention produces a synergistic action which causes the mixture to perform better in combination than it would in its component parts. For example, the application of sodium chloride or potassium chloride by itself to an ice-coated surface will not give the same results as will the combination of the chemicals of this invention. In the following table, it will be noted that a 3:1 ratio by weight of sodium chloride to potassium chloride produces a eutectic temperature which is lower than that of other combinations of sodium chloride and potassium chloride. In particular, a 3:1 ratio of sodium chloride to potassium chloride with 3% by weight of the salt of urea provides a 0.5° F. freezing point which is lower than all other combinations of sodium chloride/potassium chloride and urea.

| | FREEZING POINT ANALYSES | | | | |
|---|---|---|---|---|---|
| Wt Ratio NaCl/KCL | 0% Urea | 1% Urea | 2% Urea Freezing Points | 3% Urea | 4% Urea |
| 1:1 | 7.0 F | 7.5 F | 5.2 F | 4.0 F | 3.9 F |
| 2:1 | 2.0 F | 5.5 F | 2.0 F | 4.0 F | 4.5 F |
| 3:1 | 2.6 F | 1.0 F | 1.8 F | 0.5 F | 3.6 F |
| 4:1 | 2.5 F | 3.5 F | 3.0 F | 2.0 F | 2.0 F |

It will be seen from the table that 20 separate samples were made up in the ratio as shown in the table of results. The mixtures were all on a weight/weight basis. A portion of each mixture was used to make a 20% solution in deionized water. Each of these was then placed in an acetone/dry ice bath and stirred vigorously with a Teflon coated stir bar. The temperature was monitored with an antifreeze thermometer with a range of 35° F. to −35° F. The freezing point temperature was recorded just as the solution turned to slush.

The lowest freezing temperature was obtained on the 3:1 sodium chloride/potassium chloride solution with 3% urea. It was recorded as 0.5° F. All other temperatures ranged from 7° F. to 0.5° F.

In the method of making the ICE MELTER composition of this invention, the salt mixture is screened to a uniform size, i.e., +8 −14 Tyler mesh, and is fed into a rotating drum mixer. The drum is approximately five feet in diameter and six feet in length. It has a perpherial speed of 149-154 feet per minute. A six inch dam on the discharge end of the inclined drum mixer retains a rolling bed of the mixed salts. A flat fan spray nozzle (Spraying Systems H.25 VV8003 or equivalent) at pressures between 25 and 40 PSIG is used to coat the urea solution on the salt mixture. Water solutions of urea with varying concentrations of from 40% to 70% by weight are used. Urea solutions can be stabilized or unstabilized depending on ambient conditions. The rolling action of the bed in the mixer acts to pass each particle of salt through the spray solution resulting in uniform coating. The material from the mixer acts to pass each particle of salt through the spray solution resulting in uniform coating. The material from the mixer is discharged into a rotary dryer, 5 feet in diameter and 30 feet long, for removal of water and crystallization of the urea. The dryer is heated with a gas burner to give the material exiting the dryer a temperature of between 140° F.–180° F.

Product material is discharged from the dryer into a cooler through a closed chute that is also a counterair plenum for both dryer and cooler. Air flow control through the cooler is by means of adjustable valves in the discharge plenum. Ambient air is drawn into the discharge end of the cooler, thereby flowing counter current to material flow at approximately 2000 cubic feet per minute. Continued moisture removal by surface evaporation tends to control final product moisture content at about 0.05%. Also, evaporative cooling tends to stabilize and harden the urea coating to prevent phase changes as environmental conditions fluctuate.

From the foregoing, it can be seen that an ice melter composition has been provided which is simple to use and harmless to the user and wherein the composition includes a salt, more particularly sodium chloride and/or potassium chloride and preferably a mixture of sodium chloride and potassium which is coated with an amide, more particularly urea. The method of making the ice melting composition is also disclosed.

What is claimed is:

1. An ice melter composition for use on driveways, sidewalks and the like comprising:
   a salt combination and an amide,
   said salt combination comprising a mixture of sodium and potassium chloride and said amide is urea,
   said sodium choride being present in the ratio by weight of 3 to 1 of said potassium chloride.

2. An ice melter composition for use on driveways, sidewalks and the like comprising:
   a salt combination and an amide,
   said salt combination comprising a mixture of 3 parts by weight of sodium chloride to 1 part by weight of potassium chloride and said amide being urea which is present and coated on said salt combination in from about 1% to about 4% by weight of said salt combination.

3. The method of making an ice melter composition comprising the steps of:
   (1) sizing the salt portion of said composition,
   (2) spraying the sized salt with a liquid amide, and
   (3) drying said composition,
   said salt being a mixture of sodium and potassium choride,
   said amide being urea, which is present in from about 1% to about 4% by weight of said salt,
   said urea being present in from about 1% to about 4% by weight of said sodium-potassium chloride mixture.

* * * * *